United States Patent [19]

Gustafsson et al.

[11] Patent Number: 5,052,498

[45] Date of Patent: Oct. 1, 1991

[54] PORTABLE HAMMER MACHINE

[75] Inventors: Klas R. L. Gustafsson, Kalmar; Ulf J. Lagne, Saltsjöbaden, both of Sweden

[73] Assignee: Berema Aktiebolag, Solna, Sweden

[21] Appl. No.: 604,764

[22] Filed: Oct. 26, 1990

[30] Foreign Application Priority Data

Oct. 28, 1989 [SE] Sweden ................................ 8903624

[51] Int. Cl.[5] .............................................. B23B 45/16

[52] U.S. Cl. .................................... 173/118; 173/119; 173/134

[58] Field of Search ............... 173/112, 118, 119, 128, 173/134, 135, 139

[56] References Cited

U.S. PATENT DOCUMENTS

| | | | |
|---|---|---|---|
| 3,559,449 | 2/1971 | Steinmetz | 173/134 |
| 3,695,366 | 10/1972 | Klessig | 173/134 |
| 3,920,086 | 11/1975 | Goppen et al. | 173/134 |
| 4,111,269 | 9/1978 | Ottestad | 173/134 |
| 4,303,133 | 12/1981 | Godolphin | 173/134 |
| 4,428,439 | 1/1984 | Moreno | 173/119 |
| 4,673,042 | 6/1987 | Steiner | 173/134 |
| 4,745,981 | 5/1988 | Buske | 173/119 |

*Primary Examiner*—Mark Rosenbaum
*Assistant Examiner*—Scott A. Smith
*Attorney, Agent, or Firm*—Eric Y. Munson; Mark P. Stone

[57] ABSTRACT

A portable hammer machine comprises a cylinder (11) in which a reciprocating drive piston (40) via a gas cushion in a working chamber (44) repeatedly drives a hammer piston (15) to impact on and to return from a tool (20) carried by the machine as soon as a feeding force is applied via the machine housing (10) to the tool (20) under compression of a spring (23) interposed therebetween. The cylinder (11) is on the one hand provided with primary ports (45) for the passage of gas to and from the working chamber (44), which ports (45) at impacting are opened above the hammer piston (15) to ventilate the working chamber (44), and on the other hand with secondary ports (46) for ventilating the volume (47) below the hammer piston (15) during its reciprocation and impacting. The spring (23) is pre-compressed in the machine housing (10) so as to balance the weight of the hammer machine when the latter is kept standing on the tool (20) with the hammer piston (15) resting against the tool (20). In such position the primary ports (45) are disposed above the hammer piston (15), and their total ventilating area and distance above the hammer piston (15) are chosen such as to maintain the hammer piston (15) idle irrespective of the operating frequency of the drive piston (40), while bringing the hammer piston (15) into repetitive impacting work in phase with a selected drive piston frequency in response to an application of a feeding force on the hammer machine and a resultant displacement of the hammer piston (15) from the idle position thereof towards the primary ports (45).

15 Claims, 4 Drawing Sheets

PORTABLE HAMMER MACHINE

BACKGROUND OF THE INVENTION

The present invention relates to portable hammer machines of the type comprising a housing with a cylinder therein, in which a reciprocating drive piston via a gas cushion in a working chamber repeatedly drives a hammer piston to impact on and to return from the neck of a tool carried by the machine housing as soon as a feeding force is applied via the machine housing to the tool and spring means interposed therebetween are compressed, the cylinder on the one hand being provided with primary ports for the passage of gas to and from the working chamber, which ports at impacting are opened above sealing means on the hammer piston to ventilate the working chamber, and on the other hand with secondary ports for ventilating the volume below the hammer piston during its reciprocation.

In prior embodiments these machines, of which one is described for example in patent GB 2,145,959, are subject to the inconvenience of the impact motor of the machine starting to pound as soon as the the tool is applied against the surface to be worked upon. That means that the initial collaring or pointing from the very first contact with the working surface has to be made under percussive action and, depending on the motor type often under full rotative motor speed, i.e. under full impact power, which makes it difficult to keep the tool exactly on the working spot aimed-at and also exposes the operator to injuries due to recoil and mis-directed blows.

SUMMARY OF THE INVENTION

It is an object of the invention to assure that the machine under correctly performed collaring can be pointed and kept on the desired working spot substantially free from risks while being brought up from null to full impact power by the operator. At the same time the operator shall have the option during work to bring the hammer machine from idle position to impact work selectively at the specific rotational speed, i.e. the impact power, deemed necessary for continued work. These objects are attained by the characterizing features of the appended claims.

BRIEF DESCRIPTION OF THE DRAWINGS

The invention is described in more detail with reference to the accompanying drawings. Therein

DESCRIPTION OF THE BEST MODES FOR CARRYING OUT THE INVENTION

Figure 1:
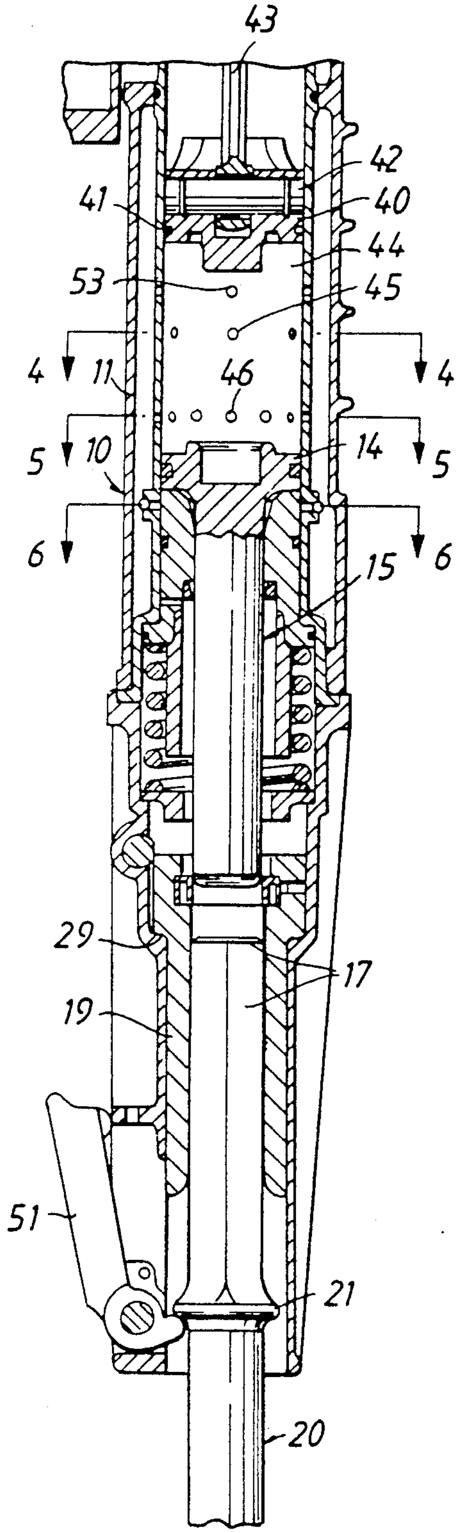
FIG. 1 shows a longitudinal partial section through a hammer machine embodying the invention, shown with its hammer piston in inactive position.
Figure 2:
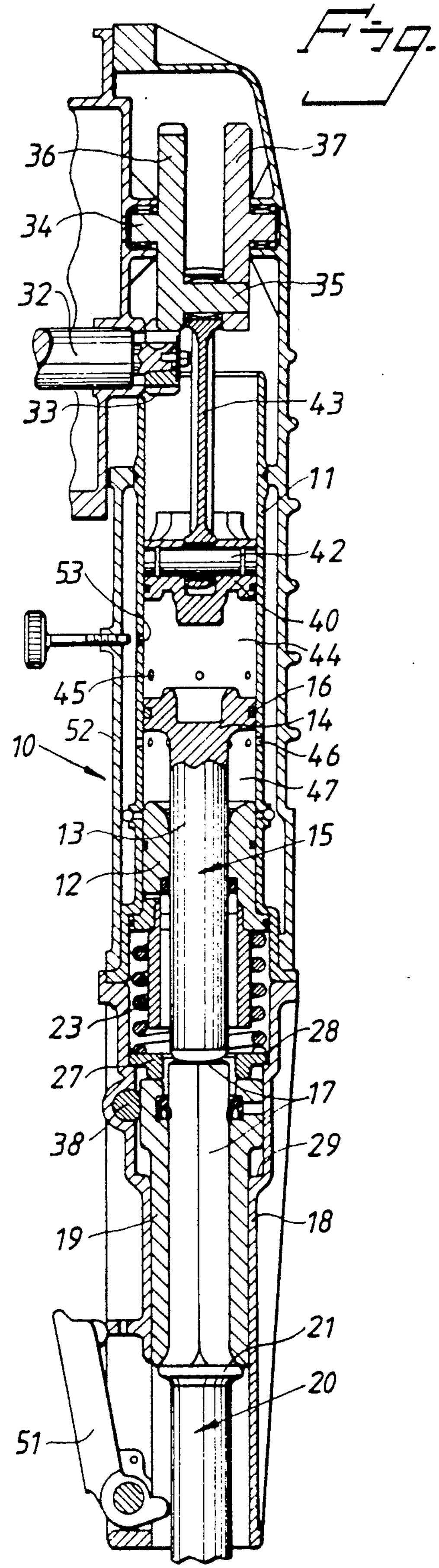
FIG. 2 shows a corresponding view with the hammer piston in idle or tool pointing position.
Figures 3A, 3B:
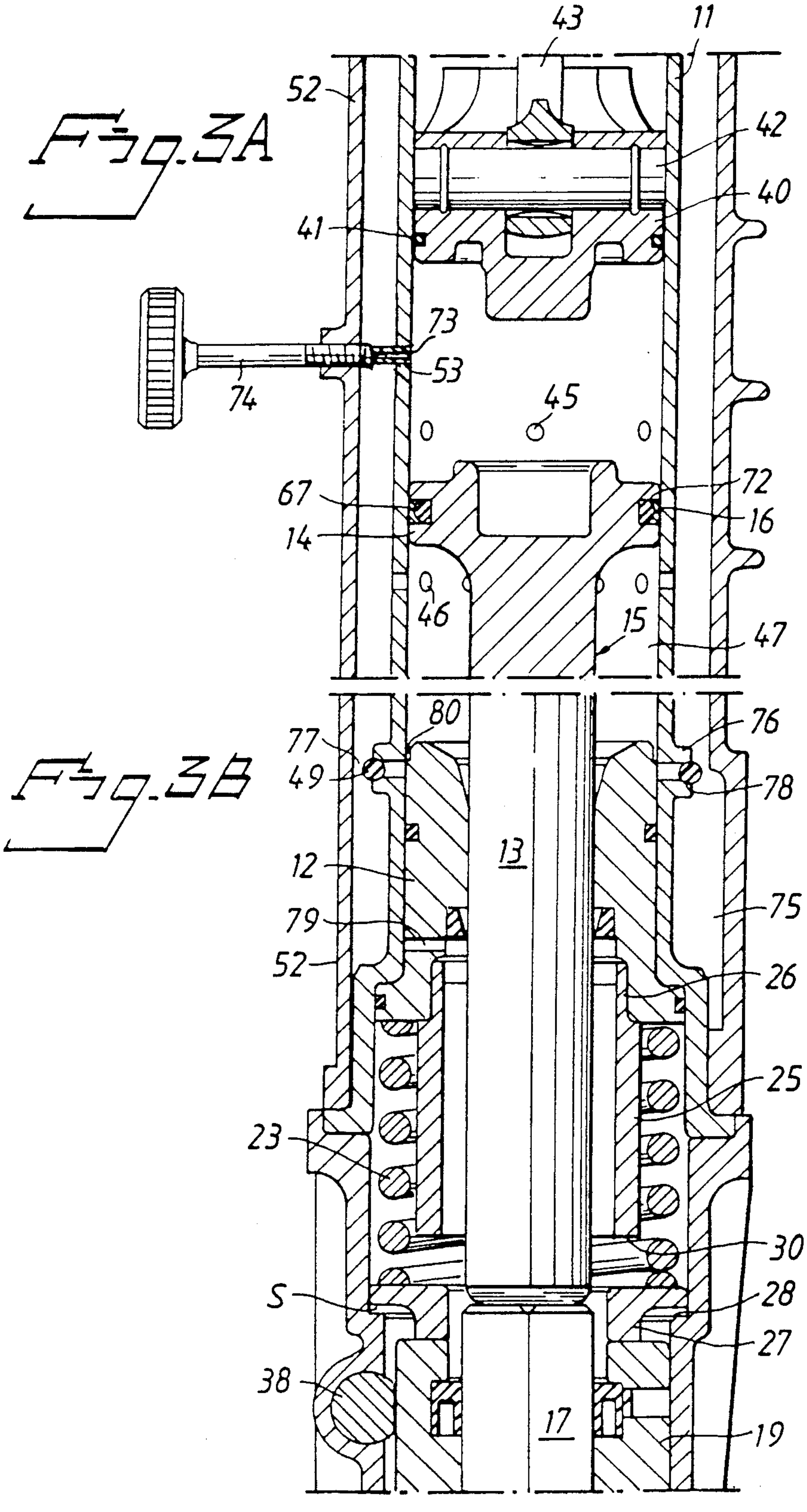
FIG. 3A is an enlarged section of the upper part of the impact motor in FIG. 2 with the addition of an optional control means for setting the impact power.
FIG. 3B shows, as a continuation of FIG. 3A, a corresponding view of the lower part of the impact motor.
Figure 7:
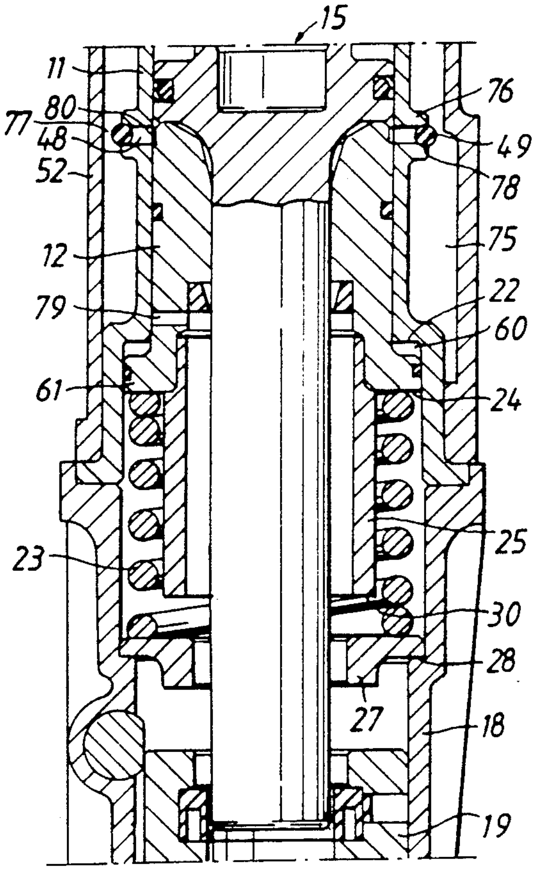
FIG. 7 corresponds to FIG. 3A but shows the hammer piston in the inactive position of FIG. 1 after an empty blow.
Figure 6:
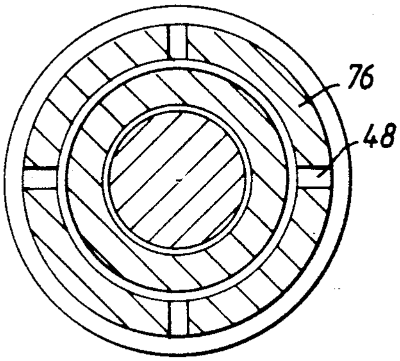

The hammer machine comprises a hand held machine housing 10 with a cylinder 11, in which a preferably differential hammer piston 15 is slidably guided and sealed by a piston ring 16 surrounding the piston head 14. The piston rod 13 passes slidably and sealingly through the bottom end or piston guide 12 and delivers impacts against the neck 17 of a tool 20, for example a pick, chisel, tamper or drill, which by a collar 21 rests axially against a tool sleeve 19 and is slidably guided therein. The sleeve 19 in its turn is axially slidably guided in the frontal end 18 of the housing 10, and when the work so demands is prevented from rotating by slidable contact of a plane surface thereon with a flattened cross pin 38 in the end 18. In the working position of FIG. 2 the sleeve 19 abuts against a spacing ring 27. A recoil spring 23 is pre-stressed between a shoulder 24 on the bottom end 12 and the spacer ring 27, urging the latter onto an inner shoulder 28 in the frontal end 18 (FIGS. 3B and 7). The pre-compression of the preferably helical spring 23 is such as to balance the weight of the machine when the latter is kept standing on the tool 20 as depicted in FIG. 2. When the machine is lifted from such position, the tool sleeve 19 will sink down to inactive position against an abutment shoulder 29 in the frontal end 18, while the sinking movement of the tool 20 continues and is stopped by the collar 21 being arrested by the stop lever 51, FIG. 1. Simultaneously therewith the hammer piston 15 sinks down taking its inactive position in the foremost part of the cylinder 11.

The housing 10 comprises a motor, not shown, which, depending on the intended use, may be a combustion engine, an electric motor or a hydraulic motor. The motor drives a shaft 32 and a gear wheel 33 thereon is geared to rotate a crank shaft 34 journalled in the upper part of the machine housing 10. The crank pin 35 of the crank shaft 34 is supported by circular end pieces 36,37 of which one is formed as a gear wheel 36 driven by the gear wheel 33. A drive piston 40 is slidably guided in the cylinder 11 and similarly to a compressor piston sealed thereagainst by a piston ring 41. A piston pin 42 in the drive piston 40 is pivotally coupled to the crank pin 35 via a connecting rod 43. Between the drive piston 40 and the hammer piston head 14 the cylinder 11 forms a working chamber 44 in which a gas cushion transmits the movement of the drive piston 40 to the hammer piston 15.

The hammer piston head 14 has an annular peripheral groove 72, FIG. 3A, carrying the piston ring 16, undivided and of wear resistant plastic material such as glass fiber reinforced PTFE (polytetrafluorethene), which seals slidably against the wall of the cylinder 11 in front of the drive piston 40. The piston ring 16 is sealed against the piston head 14 by an O-ring of preferably heat resistant rubber (Viton,TM), which sealingly fills the gap therebetween. As an alternative, the piston head 14 may be machined to have a sealing and sliding fit in the cylinder 11, in which case the piston ring 16 and groove 27 are omitted.

Figure 4:
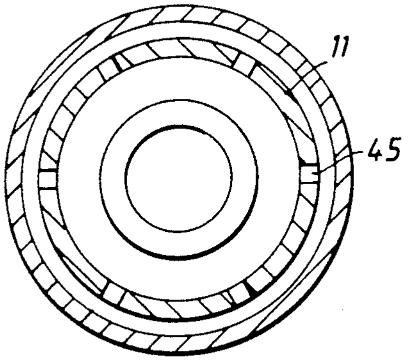
FIGS. 4, 5, and 6 show cross sections through the cylinder of the hammer machine seen along the respective lines 4—4, 5—5, and 6—6 in FIG. 1.
Figure 5:
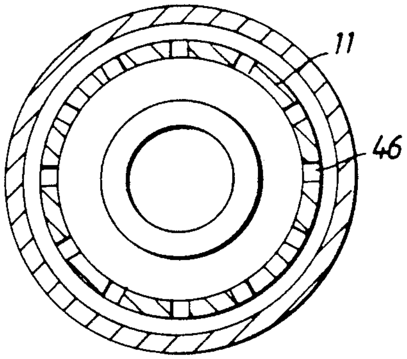

The machine comprises a mantle 52 with the interior thereof suitably connected to the ambient air in a way preventing the entrance of dirt thereinto. The gas cushion in the working chamber 44 transmits by way of alternating pressure rise and vacuum the reciprocating movement of the drive piston 40 to the hammer piston 15 in phase with the drive generated by the motor and the crank mechanism. The working chamber 44 communicates with the interior of the machine through the wall of cylinder 11 via primary ports 45, FIG. 4, and secondary ports 46, FIG. 5. These ports 45,46 are peripherally and evenly distributed in two axially spaced planes perpendicular to the axis of the cylinder 11. The total area of the primary ports 45 is important for the idle operation of the machine and its transition from idling to impacting. The secondary ports 46 have only ventilating effect and their total area is greater, for example the double of the primary area as seen from FIGS. 4,5. Additionally there is provided a control opening 53 in the cylinder wall disposed between the lower turning point of the drive piston 40 and the primary ports 45. As seen from FIG. 2, the sealing portion of the hammer piston head 14, i.e. in the example shown the piston ring 16, in the idle position thereof is disposed intermediate the primary and secondary ports 45,46. The total ventilating area of opening 53 and primary ports 45 and the distance of the latter to the piston ring 16 are calculated and chosen such that the hammer piston 15 in its abovementioned idle position is maitained at rest without delivering blows while the overlying gas volume is ventilated freely through the ports and opening 45,53 during reciprocation of the drive piston 40 irrespective of its frequency and the rotational speed of the motor.

When starting to work, the operator, with the motor running or off, directs by suitable handles, not shown, the machine to contact the point of attack on the working surface by the tool 20 whereby the housing 10 slides forwardly and spacing ring 27 of the recoil spring 23 abuts on the tool sleeve 19, (FIG. 2). The operator selects or starts the motor to run with a suitable rotational speed and then applies an appropriate feeding force on the machine. As a result the recoil spring 23, the pre-compression of which has to be chosen strong enough to substantially balance the weight of the machine in its FIG. 2 position, is compressed further, for example the distance S indicated in FIG. 3B, the hammer piston head 14 is displaced towards the primary ports 45, the ventilating conditions in the working chamber 44 are altered so as to create a vacuum that to begin with will suck up the hammer piston 15 at retraction of the drive piston 40. The suction simultaneously causes a complementary gas portion to enter the working chamber 44 through the control opening 53 so that a gas cushion under appropriate overpressure during the following advance of the drive piston 40 will be able to accelerate the hammer piston 15 to pound on the tool neck 17. The resultant rebound of the hammer piston 15 during normal work after each impact then will contribute to assure its return from the tool 20. Therefore, the percussive mode of operation will go on even if the feeding force is reduced and solely the weight of the machine is balancing on the tool 20. The control opening 53 is so calibrated and disposed in relation to the lower turning point of the drive piston 40 and to the primary ports 45, that the gas stream into and out of the control opening 53 in pace with the movements of the drive piston 40 maintains in the working chamber 44 the desired correct size of and shifting between the levels of overpressure and vacuum so as to assure correct repetitive delivery of impacts. The dimension and position of the control opening 53 and/or an increased number of such openings strongly influences the force of the delivered impacts. The secondary ports 46 ventilate and equalise the pressure in the volume below the piston head so that the hammer piston 15 can move without hindrance when delivering blows.

In order to return to the idle position in FIG. 2 with the drive piston 40 reciprocating and the hammer piston 15 immobile, it is necessary for the operator to raise the hammer machine for a short distance from the tool 20 so that the neck 17 momentarily is lowered relative to the hammer piston 15 causing the latter to perform an empty blow without recoil. As a result the hammer piston 15 will take the inactive position of FIG. 1, the secondary ports will ventilate the upper side of the hammer piston 15 and impacting ceases despite the continuing work of the drive piston 40. Such mode of operation is maintained even upon the machine being returned to the balanced position thereof in FIG. 2 with the hammer piston head 14 returned to idle position between the ports 45,46.

Below the secondary ports 46 the cylinder 11 forms a braking chamber 47 for the hammer piston head 14. The chamber 47 catches pneumatically the hammer piston 15 in response to empty blows. Blows in the void are often performed so vehemently that the damping effect of the braking chamber 47 would become insufficient or the chamber 47 would be overheated. In order to cope with these effects and avoid harmful metallic bottom collisions, the bottom end 12 of the cylinder 11 is resiliently supported in the direction of impact against the action of the recoil spring 23 on which the bottom end 12 is supported by a piston head 61 formed thereon and maintained by the recoil spring 23 against an inner annular shoulder 24 on the cylinder 11. By suitably arranged sealing rings the bottom end 12 is slidably sealed against the cylinder 11 with the piston head 61 received in a cylinder chamber 60 formed at the frontal end of the cylinder 11.

When at an empty blow the damping pressure in the braking chamber 47 is increased, the bottom end 12 is displaced resiliently downwardly, FIG. 7 and opens, similarly to the function of a check valve, throttling apertures 48 provided in an annular outwardly directed collar 76 on the cylinder 11. The throttling apertures 48 are fewer than the secondary ports 46, at equal size about for example in the relation 4 to 12, and the resultant throttling, which to begin with, due to the increasing size of the gap uncovered by the edge 80 of the the bottom end 12, allows an increasing gas flow at increased spring compression, will then finally arrest the hammer piston 15 so that compressive overheating and metallic collision are avoided. The spring returned check valve action of the bottom end 12 seals off the apertures 48 against gas return and the hammer piston 15 is kept caught in the braking chamber 47 until the vacuum condition created therein can be overcome by pressing up the tool 20 against the hammer piston 15 by application of the machine weight and of an appropriate feeding force.

The resilient downward movement of the bottom end 12 is further braked by the vacuum created in the cylinder chamber 60 above the piston head 61. At continued movement a radial passage 79 in the bottom end 12 is eventually opened to the cylinder chamber 60 filling the same with gas and thus filled, the chamber 60 then is active to brake the resilient return movement by gently returning the bottom end 12 to its original position.

The collar 76 has an annular groove 78 thereon in alignment with the apertures 48 and supporting therein an O-ring 49. The O-ring 49 covers the throttling apertures 48 and functions as a check valve with a faster valving response than provided by the bottom end 12. The ring 49 is thus able to instantly prevent return flow of gas and also inflow of oil into the braking chamber 47. At the bottom within the mantle 52 below the collar 76 there is namely provided a replenishable minor oil compartment 75 around the cylinder 11, FIG. 3B, with a clearance 77 around the collar 76 level with the O-ring 49, the clearance 77 allowing oil to seep or splash up from the compartment 75 along the walls within the mantle 52 during handling of the machine. Thereby the gas ventilation from the mantle 52 through the ports 45,46 and opening 53 acts to keep the interior of cylinder 11 lubricated by aspirated airborne oil droplets.

By changing the control opening area defining the maximum impact force attainable at work, dividing the area on a plurality of openings, and stepwise covering a selected number of them, the impacting force can be suitably adjusted for different type of work. FIG. 3A depicts an embodiment with a control means such as a threaded set spindle 74, which in a projected position by its tip is set to close a single control opening 53. An axial and then outwardly branched through passage 73 in the spindle tip connects the working chamber 44 to the interior of the mantle and defines a reduced control area suitable for inter alia breaking and similar heavy work. When a lesser impact force is necessary for example for drilling, the set spindle 74 is opened to uncover the full area of the opening 53, thereby reducing the attainable drive pressure in the working chamber 44 and thus the impacting force.

Important for a safe return function is that the primary ports 45 are uncovered at the moment of impact. In order to assure that, a limit stop 30 is provided in the housing 10 in order to restrict the range wherein the tool neck 17 is exposed to repetitive impacts. That range extends from beginning displacement of the spacing ring 27 by the neck 17, FIG. 3B, i.e. when the recoil spring 23 due to application of a feeding force starts being compressed by said spacing ring 27, and is continued to the rear until the spacing ring 27 abuts against the limit stop 30. Said stop 30 is formed by one end of a sleeve 25 disposed around the hammer piston rod 13 inwardly of the recoil spring 23. The other end 26 of the sleeve 25 is connected to the housing 10, in the example shown being attached to the bottom end 12. At maximum compression of the spring 23 the spacing ring 27 thus is arrested by the limit stop 30 so that further compression is prevented. In such position the primary ports 45 are still open to gas ventilation above the sealing area or the piston ring 16 on the hammer piston head 14. Due to the thus restricted impacting range, the piston ring 16 at the moment of impact will always be surrounded by cylinder wall portions free from through ports or openings liable to cause undesirable deformation of the piston ring 16.

The spacing ring 27 should be replaced by a lower ring if the hammer machine is to operate with tools having a shorter standardized neck portion. Furthermore the sleeve 25 in case of need can be mounted the other way round affixed to the spacing ring 27 and be driven to stop with the limit stop 30 in abutment with the bottom end 12 (piston head 61) without reduced safety.

The hammer machine can be modified constructionally in particular for drilling work by associating the machine housing 10 with conventional means for rotating the tool 20 via gearing driven by the shaft 32. Air compressing means or a water supply will then conventionally be included to deliver flushing medium to the drilling edges.

We claim:

1. A portable hammer machine comprising a housing (10) with a cylinder (11) therein, in which a reciprocating drive piston (40) via a gas cushion in a working chamber (44) repeatedly drives a hammer piston (15) to impact on and to return from a neck (17) of a tool (20) carried by the machine housing (10) as soon as a feeding force is applied via the machine housing (10) to the tool (20) and spring means (23) interposed therebetween are compressed, the cylinder (11) being provided with primary ports (45) for the passage of gas to and from a working chamber (44), which ports (45) at impacting are opened above sealing means (16) on the hammer piston (15) to ventilate the working chamber (44), the cylinder further being provided with secondary ports (46) for ventilating a chamber (47) defined below the hammer piston (15) during its reciprocation, characterized in that the spring means (23) are pre-compressed in the machine housing (10) so as to balance the weight of the hammer machine when the hammer machine is kept standing on the tool (20) with the hammer piston (15) resting in an idle position on the neck (17) of the tool (20), said primary ports (45) being disposed above the sealing means of the hammer piston (15), the total ventilating area of the primary ports (45) and their distance above the hammer piston (15) being chosen such as to maintain the hammer piston (15) idle in such balanced position of the hammer machine irrespective of the operating frequency of the drive piston (40), while repeatedly driving the hammer piston (15) to deliver impacting forces to the neck of said tool in phase with said drive piston frequency in response to a momentary application of a feeding force on the hammer machine and resultant displacement of the hammer piston (15) from the idle position thereof towards the primary ports (45).

2. A machine according to claim 1, wherein the primary ports (45) are peripherally distributed in a plane perpendicular to the axis of the cylinder (11).

3. A machine according to claim 2, wherein the hammer piston (15) is a differential piston with a piston head (14) the sealing means (16) of which in the idle position of the hammer piston (15) are disposed intermediate the secondary (46) and the primary (45) ports.

4. A machine according to claim 1, wherein the hammer piston (15), with the hammer machine momentarily retracted from the tool (20), is adapted to move past the secondary ports (46) without delivering an impacting force to said tool for the transition from an operating mode in which impacting forces are delivered to said tool in phase with reciprocating movement of the drive piston (40) to said idle position on the tool (20) with the hammer machine returned to said balanced position on the tool (20) and remaining unaffected by the reciprocating movement of the driven piston (40).

5. A machine according to claim 1, wherein at least one control opening (53) for the passage of gas to and from the working chamber (44) of the cylinder (11) is provided in the wall of the cylinder (11) between a lower turning point of the drive piston (40) and the primary ports (45) and adapted to define by its ventilating area a drive pressure attainable in the working chamber (44) for providing the impacting power of the machine.

6. A machine according to claim 5, wherein a control means (74) is associated with said control opening (53), said control means (74) reducing the ventilating area of the control opening (53) to provide an increased drive pressure in the working chamber (44) in a first position of said control means, and said control means increasing said ventilating area to reduce the drive pressure in said working chamber in a second position of said control means.

7. A machine according to claim 1, wherein the hammer piston (15) is provided with a piston ring (16) for sealing cooperation with the cylinder (11), and means (28,30) are provided in the machine housing (10) to limit the compressibility of said spring means (23) so as to keep the piston ring (16) below said primary ports (45) during impacting of said tool.

8. A portable hammer machine comprising a housing with a cylinder therein, a drive piston and a hammer piston within said cylinder, and means for reciprocatingly moving the drive piston via a gas cushion in a working chamber defined within the cylinder for repeatedly driving said hammer piston to impact against and to return from a neck of a tool carried by the machine housing in response to a feeding force applied to the tool via the machine housing and the compression of spring means interposed between the machine housing and the tool, a plurality of primary ports defined on the cylinder for the passage of gas to and from said working chamber defined within the cylinder, said primary ports being opened above sealing means on the hammer piston to ventilate the working chamber when the hammer piston delivers impacting forces to the neck of the tool, and a plurality of secondary ports defined on the cylinder for ventilating a chamber below the hammer piston during reciprocating movement of said hammer piston, said spring means in said machine housing being precompressed to balance at least a portion of the weight of the hammer machine when said hammer machine rests on said tool with the hammer piston resting in an idle position on the neck of the tool, said primary ports being disposed above the sealing means of the hammer piston, the total ventilating area of the primary ports and their distance above the hammer piston being selected to maintain the hammer piston in said idle position independent from operating frequency of said drive piston, while repeatedly driving the hammer piston to deliver impacting forces to said tool in phase with said operating frequency of the drive piston in response to a momentary application of a feeding force on the hammer machine and resultant displacement of the hammer piston from said idle position thereof towards said primary ports.

9. A machine according to claim 8, wherein the primary ports are peripherally distributed in a plane perpendicular to the axis of the cylinder.

10. A machine according to claim 9, wherein the hammer piston is a differential piston with a piston head the sealing means of which in the idle position of the hammer piston are disposed intermediate the secondary and the primary ports.

11. A machine according to claim 8, wherein the hammer piston, with the hammer machine momentarily retracted from the tool, is adapted to move past the secondary ports (46) without delivering an impacting force to said tool for the transition from an operating mode in which impacting forces are delivered to said tool in phase with reciprocating movement of the drive piston to said idle position on the tool with the hammer machine resting on the tool and remaining unaffected by the reciprocating movement of the drive piston.

12. A machine according to claim 8, wherein at least one control opening for the passage of gas to and from the working chamber of the cylinder is provided in the wall of the cylinder between a lower turning point of the drive piston and the primary ports and adapted to define by its ventilating area a drive pressure attainable in the working chamber for providing the impacting power of the machine.

13. A machine according to claim 12, including control means associated with said control opening, said control means reducing the ventilating area of the control opening to provide an increased drive pressure in the working chamber in a first position of said control means, and said control means increasing said ventilating area to reduce the drive pressure in the working chamber in a second position of said control means.

14. A machine according to claim 8, wherein the hammer piston is provided with a piston ring for sealing cooperation with the cylinder, and means are provided in the machine housing to limit the compressibility of said spring means so as to keep the piston ring below said primary ports during impacting of said tool.

15. A machine according to claim 8, wherein said spring means is precompressed to balance the entire weight of said hammer machine.

* * * * *